(12) United States Patent
Song et al.

(10) Patent No.: US 7,386,855 B2
(45) Date of Patent: Jun. 10, 2008

(54) APPLICATION MOBILITY SERVICE

(75) Inventors: Yu Song, San Jose, CA (US); Hao-hua Chu, Mountain View, CA (US); Nayeem Islam, Palo Alto, CA (US); Masaji Katagiri, Los Altos, CA (US)

(73) Assignee: NTT DoCoMo, Inc., Tokyo (JP)

( * ) Notice: Subject to any disclaimer, the term of this patent is extended or adjusted under 35 U.S.C. 154(b) by 790 days.

(21) Appl. No.: 10/217,276

(22) Filed: Aug. 12, 2002

(65) Prior Publication Data

US 2004/0044721 A1    Mar. 4, 2004

(51) Int. Cl.
G06F 3/00 (2006.01)
(52) U.S. Cl. ...................................... 719/310
(58) Field of Classification Search ................. 719/310
See application file for complete search history.

(56) References Cited

U.S. PATENT DOCUMENTS

| | | | |
|---|---|---|---|
| 6,816,613 B2* | 11/2004 | Tohyama et al. | 382/167 |
| 2003/0110266 A1* | 6/2003 | Rollins et al. | 709/227 |
| 2003/0137947 A1* | 7/2003 | Roy et al. | 370/310 |

OTHER PUBLICATIONS

Thomas Phan, A new Twist on mobile computing: Two-way interactive session transfer, 2001.*
Thomas Phan, A Scalable, distributed Middleware service architecture to support mobile internet applications, 2001.*
Thomas Phan, Handoff of Application Sessions Across Time and Space, Jun. 2001.*
Song, H., Chu, H.H., Islam, N., Kurakake, S., "Browser State Repository Service," Proc. of Pervasive '02, Aug. 2002.
Chu, H.H., Song, H., Wong, C., Kurakake, S., "Seamless Applications Over Roam System," UbiTools '01 (Part of ACM UbiComp '01), Sep. 2001.
Phan, T., Xu, K., Guy, R., Bagrodia, R., "Handoff Of Application Sessions Across Time and Space," Proc. of ICC '01, Jun. 2001.
Schulzinne, H., Wedlund, E., "Application-Layer Mobility Using SIP," Mobile Computing and Communications Review, vol. 4, No. 3, pp. 47-57, Jul. 2000.
Raman, B., Katz, R., Joseph, A., "Universal Inbox: Providing Extensible Personal Mobility and Service Mobility in an Integrated Communication Network," Workshop on Mobile Computing Systems and Applications (WMSCA '00), Dec. 2000.
Swierk, E., Kiciman, E., Laviano, V., Baker, M., "The Roma Personal Metadata Service," Proc. of IEEE Workshop on Mobile Computing Systems and Applications, Dec. 2000.

* cited by examiner

Primary Examiner—William Thomson
Assistant Examiner—LeChi Truong
(74) Attorney, Agent, or Firm—Blakely, Sokoloff, Taylor & Zafman LLP

(57) ABSTRACT

A method and system for preserving application session states among multiple terminals. An application session state is captured from a first terminal. The application session state is stored on a central storage device or repository server. The application session state is then retrieved from the central storage device with a second terminal. At least one application on the second terminal is then placed in the application session state using the information that is retrieved from the central storage device.

27 Claims, 5 Drawing Sheets

APPLICATION MOBILITY SERVICE

FIELD OF THE INVENTION

The present invention relates generally to network computing and more particularly, to an application mobility service that enables a user to seamlessly and effortlessly transfer an active application session to any device that is accessible or convenient to the user simultaneously or at a later time.

BACKGROUND OF THE INVENTION

As people become more mobile, there is an increasing demand for computing in locations and situations that diverge from the traditional wired environment. The popularity of mobile devices such as laptop computers, personal digital assistants (PDAs) and wireless telephones, further makes nomadic computing a desirable and viable life style. However, most of today's applications are session-oriented. As used herein, the term session orientation means that a particular application is constrained by the device, platform, location, and time.

The session-oriented model places a limitation such that for the duration of an application session, a user cannot switch devices; otherwise, the user might lose their active application session and would need to restart it on a new device. Consider a scenario when a user is running an application on a stationary device (such as a desktop PC), but an alternative mobile device (such as a Pocket PC or laptop with wireless access) is available to the user. If the user would like to continue their application on the mobile device they could not do so without losing their active application session on the stationary device.

Consider another scenario when the user is running an application on their office desktop PC and must leave the office to attend a meeting at a remote location. The user can carry their laptop (with wireless access) with them on the flight to the meeting. Let's say that during the flight or at the airport the user would like to continue their application on their laptop, but again, they could not do so without losing their active application session on the laptop computer.

In both scenarios set forth above an alternative approach would be that the user saves their documents into a portable media. At a later time, the user must read or extract the documents from the portable media back into the mobile device and restart work on the documents on the mobile device. Such an approach requires the user's effort to move the document from one physical device to another physical device and is time consuming and undesirable. As such, a need exists for an Application Mobility Service (AMS) that enables a user to seamlessly and effortlessly transfer an active application to any device that is accessible or convenient to the user simultaneously or at a later time.

SUMMARY OF THE PRESENT INVENTION

A preferred embodiment of the present invention discloses a method of preserving application session states among multiple terminals. An application session state is captured from a first terminal and stored on a central storage device. The application session state is then retrieved from the central storage device with a second terminal. After the application session state is retrieved from the central storage device, at least one application is launched and restored to the application session state that is stored from the first terminal.

Another preferred embodiment of the present invention discloses an application mobility system. This preferred embodiment includes an application mobility service agent that is installed on a first terminal. An application is located on the first terminal, wherein the application mobility service agent is operable to capture an application session state of the application on the first terminal. A central storage device is connected to the first terminal, wherein the application mobility service agent is operable to transmit the application session state to the central storage device. A second terminal is connected to the central storage device, wherein the second terminal is operable to retrieve the application session state from the central storage device. Once the application session state is retrieved, the second terminal restores the application to the application session state stored from the first terminal.

A preferred embodiment of the present invention also discloses a method of preserving application session states among multiple terminals. In this embodiment, an application session state is captured from a first application on a first terminal. The application session state is then stored on a central storage device that is connected to the first terminal. The application session state is then retrieved from the central storage device using a second terminal. A second application located on the second terminal is then restored to the application session state stored from the first terminal. In this embodiment, the first terminal and the second terminal are preferentially different types of computing devices that are running different formats of similar applications. For example, the first terminal may be a PDA and the second terminal may be a personal computer that are both running copies of Microsoft Word® that are specifically designed for each computing device.

Yet another preferred embodiment of the present invention discloses an application mobility system. This embodiment includes a first terminal having a first application that has an application session state associated therewith. An application mobility service agent is also located or installed on the first terminal. A central storage device is connected to the first terminal for storing the application session state, wherein the application mobility service agent transmits the application session state to the central storage device. A second terminal is connected to the central storage device that includes a second application as well as the application mobility service agent. The second terminal is operable to restore the second application to the application session state by retrieving the application session state from the central storage device and moving the second terminal to the application session state.

Another preferred embodiment discloses a method of providing application code and preserving application session states among multiple terminals. In this embodiment, an application in a first application code format is downloaded to a first terminal from an application provider. A first application session state is then stored from the application on the first terminal on a central storage device. The application is then downloaded to a second terminal from the application provider server in a second application code format. Next, the stored application session state is then retrieved from the central storage device with the second terminal. The application is then restored with the second terminal to the application session state.

Finally, yet another preferred embodiment of the present invention discloses an application mobility system for application service providers. In this embodiment, an application in a first application code format is located on an application provider server. A first terminal is connected to the application provider server and is operable to download the application in the first application code format from the application provider server. An application mobility service agent is located on the first terminal, wherein the application mobility service agent is operable to capture an application session state from the application on the first terminal. A central storage device is connected to the first terminal, wherein the application mobility service agent is operable to store the application session state on the central storage device.

A second terminal is also preferentially connected to the application provider server and the central storage device, wherein the second terminal also includes the application mobility service agent. The second terminal is operable to download the application in a second application code format from the application provider server and the application mobility service agent on the second terminal restores the application in the second application code format to the application session state.

Further objects and advantages of the present invention will be apparent from the following description, reference being made to the accompanying drawings wherein preferred embodiments of the invention are clearly illustrated.

DETAILED DESCRIPTION OF THE PRESENTLY PREFERRED EMBODIMENTS OF THE INVENTION

Figure 1:
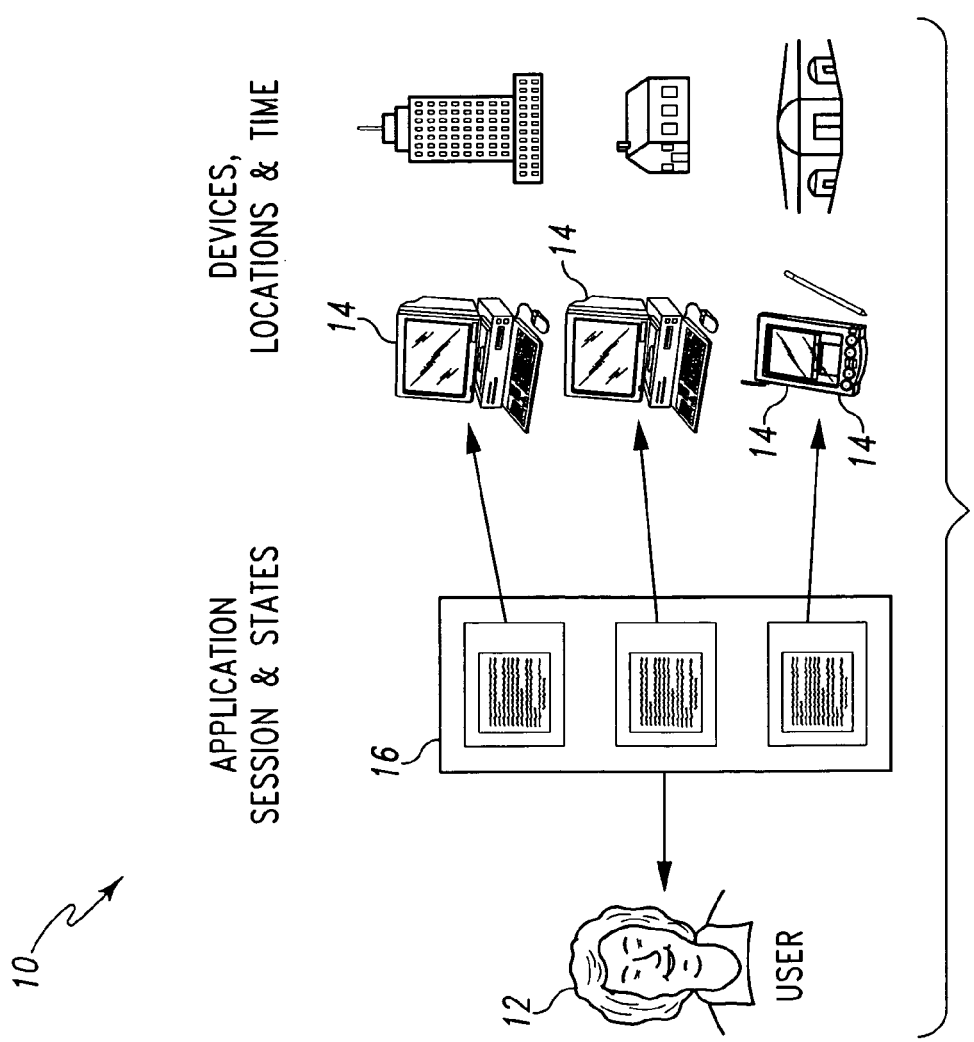
FIG. 1 generally illustrates an application mobility service for transferring application sessions to various types of terminals.

Referring to FIG. 1, a preferred embodiment of the present invention discloses an application mobility service (AMS) 10 that enables a user 12 of a terminal 14 to seamlessly activate an application session 16 using a plurality of terminals 14 that are accessible or convenient to the user 12 simultaneously or at a later time. The application sessions 16 can be in various states depending on each respective application session 16 and the type of user interaction that is taking place on the terminal 14. The terminals 14 may be desktop computers, laptop computers, personal digital assistants (PDAs) or any other type of device that is capable of accessing and utilizing a respective software application. The terminals 14 can be located in a variety of places such as at a business, a home or a location of travel.

The AMS 10 is used to decouple the association between the application session 16 and its respective terminal 14, platform, location and time in favor of a new association between the application session 16 and the respective user 12. An application session 16 is defined in the context of a given application to be the states of the application in its process data space that is independent of the architecture and operating system of the respective terminals 14. The independence allows the application session 16 to move from one application session 16 on one terminal 14 to another implementation of the same application session 16 on another terminal 14 so long as this multi-platform application session 16 can handle session data uniformly.

The benefits of the AMS 10 is that it allows users 12 to handoff an active application session 16 from one terminal 14 to another respective terminal 14 without losing the application session 16 and having to restart the application session 16 on the new terminal 14 at a new location and time. It also allows the user 12 to keep track of multiple active application sessions 16, freely save, and continue any active application session 16 at any given time from any heterogeneous terminal 14.

Figure 2:
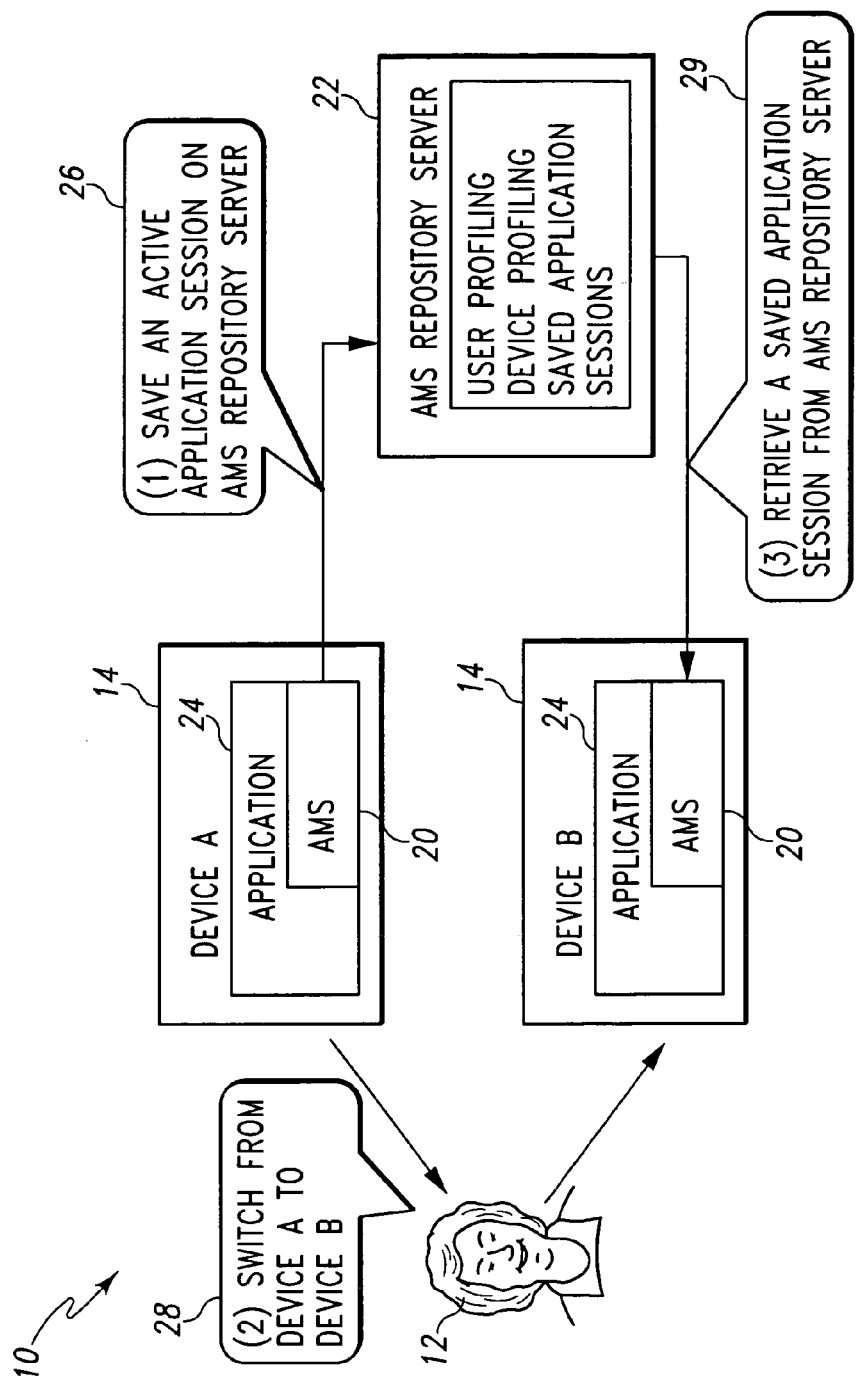
FIG. 2 illustrates an application mobility service for a plurality of terminals connected to different kinds of networks.

The AMS 10 provides users 12 with seamless access to data from a wide variety of terminals 14 over a variety of different network environments. The preferred AMS 10 is illustrated in FIG. 2 and contains two modules. The preferred AMS 10 contains an AMS agent 20 and an AMS repository server 22. The AMS agent 20 is a software agent that resides on each respective terminal 14 and acts as a proxy between the AMS repository server 22 and the terminals 14. The AMS agent 20 facilitates user authentication, session saving and restoration on the terminals 14 among other things.

The AMS repository server 22 provides the following functionalities: 1) user authorization and authentication; 2) device and user profiling; and 3) storage. During user authorization and authentication, the AMS repository server 22 authorizes and authenticates users 12, thereby allowing them to use the AMS 10. Device profiling is the process during which the AMS repository server 22 keeps track of and monitors device capabilities and fetches application data per user's requests. The AMS repository server 22 also provides an always-connected storage area for authenticated users 12 to store application sessions 16 and data that is associated with each particular application session 16 (such as date filed).

A user 12 who wants to use the AMS 10 must first setup the AMS repository server 22. The user 12 can setup one of their own respective terminals 14 as the AMS repository server 22 or, preferentially, the user 12 will choose to use a commercial AMS repository server 22. In addition, the user 12 will need to install and launch the AMS agent 20 on each of their respective terminals 14. In order to utilize the AMS repository server 22, the user 12 must login to the AMS repository server 22 by filling in a login window generated by the AMS agent 20, which will require an AMS user name and an AMS password.

The discussion set forth below provides a detailed step-by-step description of the AMS 10 set forth in FIG. 2 for two different categories of multi-platform applications 24. Preferentially, the multi-platform application 24 is written in a platform independent language, such as Java or C#, which can run on any platform regardless of the underlying operating system and hardware architecture. In addition, preferably the multi-platform application 24 has multiple platform-specific implementations that each implementation can only run on the hardware architecture and operating system it is designed to function on during operation.

As briefly set forth above, in the preferred embodiment of the present invention the applications that are designed to function with the AMS 10 are preferentially applications 24 written in platform independent languages that run on any platform regardless of the underlying operating system and hardware architecture. Instead of requiring pre-installation the of application on the terminals 14, the AMS agent 20 optionally saves the platform-independent application code as well as the application session data on the AMS repository server 22 when the user 12 wants to capture the application session 16; and restores the platform-independent application code and application session data when the user 12 wants to restore the session on a respective terminal 14.

Referring to FIG. 2, during normal operation a respective user 12 will be using an application on terminal 14A. When the user 12 wants to switch to terminal 14B, the user 12 will instruct the AMS agent 20 to save the active application session 16 on the AMS repository server 22, which is illustrated at step 26. At step 28, the user 12 logs into terminal 14B. If the user 12 wants to continue the active application session 16 from terminal 14B, the user 12 will use the AMS agent 20 or terminal 14B to retrieve the saved application session 16 from the AMS repository server 22, which is illustrated at step 29.

Figure 3:
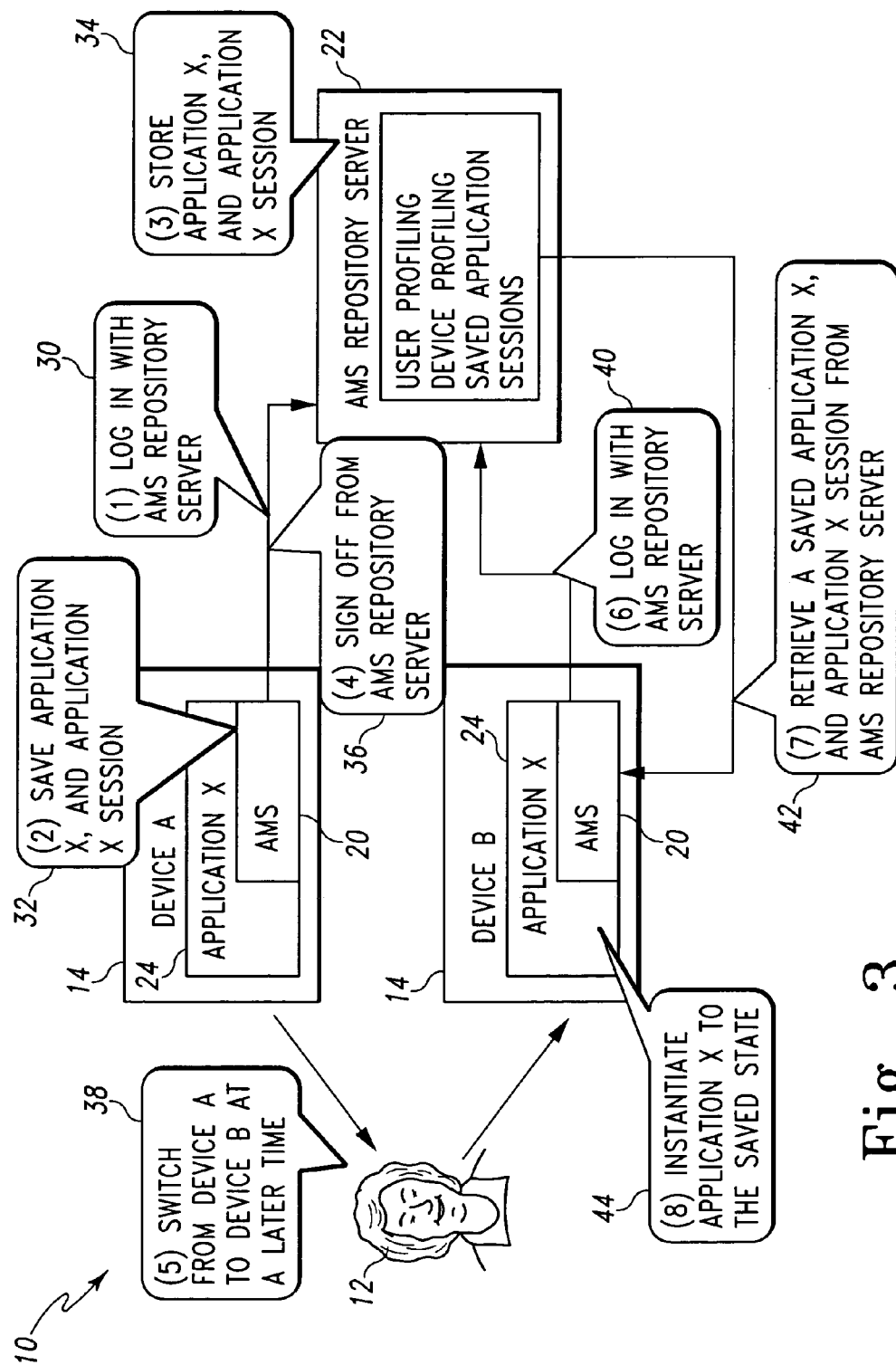
FIG. 3 illustrates an application mobility service for a platform-independent application.

Referring to FIG. 3, the discussion below details how the AMS 10 saves and restores an application session 16, which typically includes application code along with application session data. First, the user 12 turns on terminal 14A. Once terminal 14A is turned on, the AMS agent 20 on terminal 14A preferentially automatically begins to run. The AMS agent 20 on terminal 14A then requests the user 12 to log into the AMS repository server 22, which is represented at step 30. The communication between the AMS agent 20 on terminal 14A and the AMS repository server 22 is preferentially accomplished using a secure network connection, such as SSL.

Once the user 12 is logged into the AMS 10, the user will then start or launch a respective multi-platform application 24 on terminal 14A and use the multi-platform application 24 to perform some of the activities that the user 12 desires to perform (such as edit or create data). After some time, the user 12 might want to leave terminal 14A. At step 32, the user 12 requests the AMS agent 20 on terminal 14A to save the multi-platform application session 16. The user can optionally assign a unique session name to the current multi-platform application session 16. The AMS agent 20 then preferentially assigns a unique session name, such as "application X on terminal 14A on DD/MM/YYYY" (DD/MM/YYYY means the month, date, and year), if the user 12 chooses not to name the application session 16. The user 12 can also have an option to protect the application session 16 with a session password.

The AMS agent 20 on terminal 14A then informs the multi-platform application 24 to save its application session data, such as the document the multi-platform application 24 has opened and has since been modified, into a platform-independent format. Next, the AMS agent 20 serializes the session name, the application code, the saved session data, and the optional session password. The serialized data (session name, application X code, session data, and optional session password) is then sent to the AMS repository server 22 through a secure network connection.

At step 34, the AMS repository server 22 receives the serialized data from the AMS agent 20 on terminal 14A. Once the serialized data is received, the AMS repository server 22 then places the data into a storage area. Before the user 12 leaves terminal 14A, the user 12 logs off of the AMS repository server 22, which is illustrated at step 36 in FIG. 3. The log off process disconnects terminal 14A from the AMS repository server 22. However, the data that has been modified or created during the application session 16 on terminal 14A has been stored on the repository server 22.

As an example, at a later time lets say that terminal 14B is accessible to user 12 and that user 12 wants to use terminal 14B to continue the saved application session 16, which is represented at step 38. The user 12 first logs into the AMS repository server 22 from the AMS agent 20 located on terminal 14B at step 40. The user 12 then uses the AMS agent 20 on terminal 14B to generate a list of the user's 12 saved application sessions 16 that are stored on the AMS repository server 22. At step 42, the user 12 selects a respective application session 16 that the user 12 was last working on or wants to work on using terminal 14A. If the application session 16 is protected by a password, the user 12 will need to enter the correct password to retrieve the application session 16 from the AMS repository server 22. The AMS agent 20 on terminal 14B then downloads the serialized data to terminal 14B through a secure network connection, such as SSL.

Upon receiving the downloaded data, the AMS agent 20 de-serializes the application code and the application platform-independent session data. Then, the AMS agent 20 launches the multi-platform application 24 on terminal 14B and restores the multi-platform application 24 to a state according to the saved platform-independent session data 16, such as re-opens a document, which is illustrated at step 44. Preferentially, the application session 16 open displays the page the user 12 was working on when the user 12 saved the application session 16 and logged off of terminal 14A. Now, the user 12 has successfully migrated the application session 16 from terminal 14A to terminal 14B and can continue activity on terminal 14B where it was left off on terminal 14A. The above-referenced detailed description preferentially applies to multi-platform applications 24 that are platform independent applications.

Figure 4:
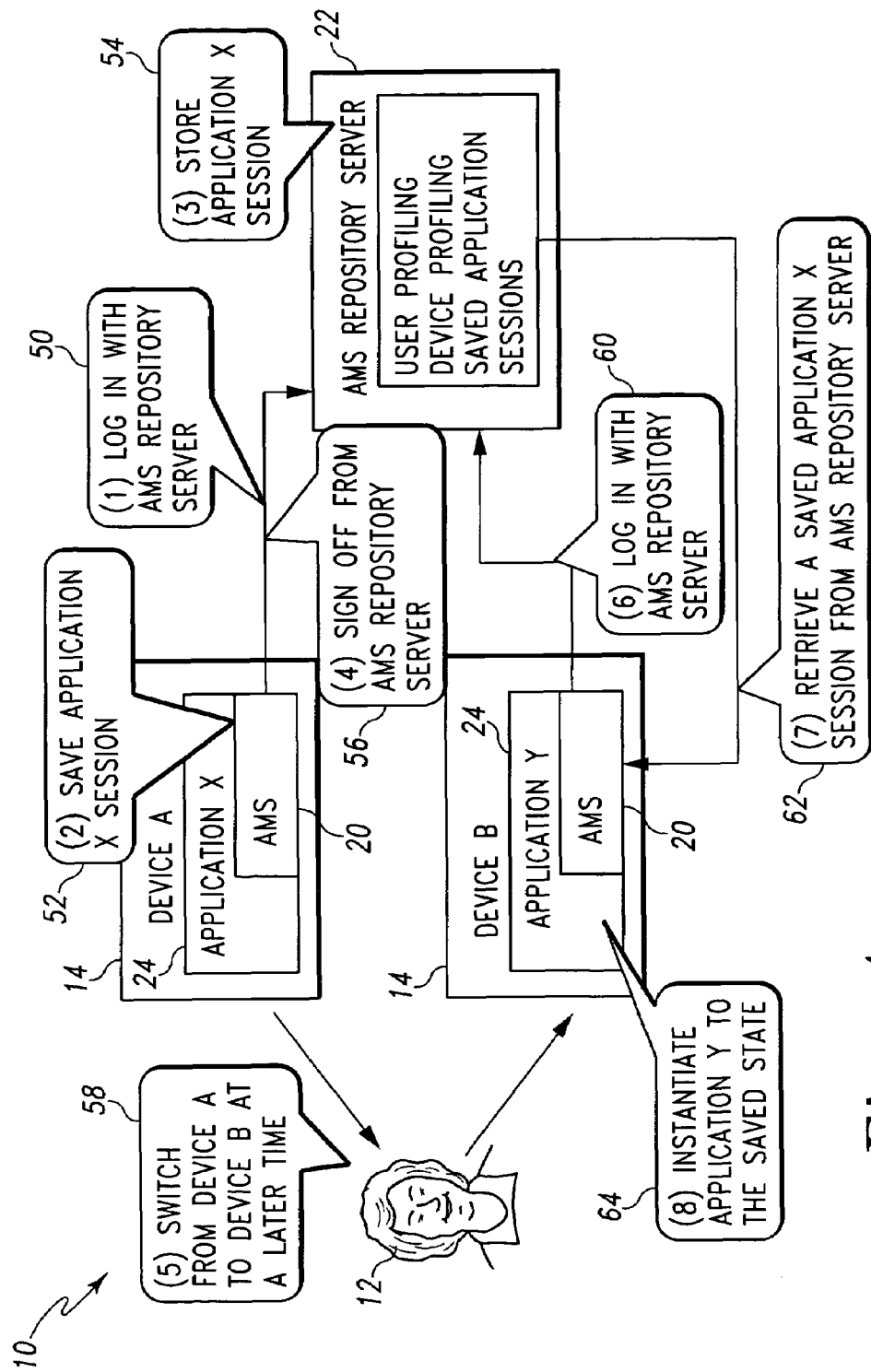
FIG. 4 illustrates an application mobility service for a platform-specific application.

Referring to FIG. 4, an AMS 10 is illustrated for a platform-specific application 24X, 24Y that is written for the specific platform and can only run on the respective terminal 14A, 14B it is designed to function on. Before the user 12 can utilize the AMS 10, the user 12 needs to install the platform-specific applications 24X, 24Y on respective terminals 14A, 14B where the user 12 might save and restore application sessions 16. For example, in order to enable AMS 10 for a Microsoft Word application between a desktop PC and a Pocket PC, the user 12 would need to install Microsoft Word on the desktop PC and install Pocket Word on the Pocket PC. For the purpose of the present invention, it is assumed that the user 12 has installed platform-specific application 24X on terminal 14A and platform-specific application 24Y on terminal 14B. Platform-specific application 24X and platform-specific application 24Y have the same functionalities. However, each platform-specific application 24X, 24Y is designed specifically for a hardware architecture and operating system installed on terminal 14A and terminal 14B respectively.

In this preferred embodiment of the present invention, once the user 12 turns on terminal 14A an AMS agent 20 on terminal 14A preferentially automatically starts to run after the user 12 turns on the power. At step 50, the AMS agent 20 on terminal 14A prompts the user 12 to log into the AMS repository server 22. The communication between the AMS agent 20 on terminal 14A and the AMS repository server 22 is preferentially through a secure channel or communication network, such as SSL.

At some point in time the user 12 launches platform-specific application 24X on terminal 14A and uses platform-specific application 24X to perform some activities, such as editing or creating documents or data files. After some time, the user 12 will want to leave or log off of terminal 14A. At step 52, the user 12 requests the AMS agent 20 on terminal 14A to save the application session 16 on platform-specific application 24X. The user 12 can optionally assign a unique session name to the current application session 16 that is ending on platform-specific application 24X. In this instance, preferentially the AMS agent 20 will assign a unique session name, such as "application 24X on terminal 14A on DD/MM/YYYY" if the user 12 chooses not to assign a unique name to the application session 16 that is ending on platform-specific application 24X.

The user 12 is also given an option to protect the application session 16 with a session password. The AMS agent 20 on terminal 14A informs platform-specific application 24X to save its session data, such as the document platform-specific application 24X has opened and since has modified, into a platform-independent format. Then, the AMS agent 20 serializes a session name, saved session data and an optional session password. The serialized data (session name, session data, and optional session password) is then preferentially sent to the AMS repository server 22 through a secure channel or communication network.

The AMS repository server 22 receives the serialized data from the AMS agent 20 on terminal 14A and then stores the data from the application session 16 into a predetermined storage area, which is illustrated as step 54 in FIG. 4. At step 56, before the user 12 leaves terminal 14A, he or she logs off of the AMS repository server 22 thereby disconnecting terminal 14A from the AMS repository server 22.

At a later time, which is represented at step 58, lets say terminal 14B is accessible to user 12 and that user 12 wants to use terminal 14B to continue the saved platform-specific application session 16 that was created on terminal 14A. As illustrated at step 60, the user 12 first logs into the AMS repository server 22 from AMS agent 20 on terminal 14B. As with terminal 14B, preferentially the AMS agent 20 on terminal 14B begins operation when power is turned on. The user 12 uses the AMS agent 20 on terminal 14B to generate a query that requests a list of that particular user's 12 saved application sessions 16 that are stored on the AMS repository server 22.

At step 62, the user 12 selects the saved application session 16 that he or she wants to work on using terminal 14A. If the application session 16 is protected by a password, the user 12 will be required to enter the correct password to retrieve the application session 16 from the AMS repository server 22. The AMS agent 20 on terminal 14B then downloads the serialized data to terminal 14B through a secure channel or communication network.

Upon receiving the downloaded data from the AMS repository server 22, the AMS agent 20 de-serializes the application session data that was previously saved using platform-specific application 24X on terminal 14A. In other words, the application session 16 is restarted on terminal 14B at the same point that it was left when user 12 logged off of terminal 14A. As such, at step 64 the AMS agent 20 restores platform-specific application 24Y on terminal 14B and restores platform-specific application 24Y to a state according to the saved platform specific session data, such as re-opens the document, and displays the page the user 12 was working on in the document or data file. As such, the AMS 10 has successfully migrated the application session 16 from application 24X's session on terminal 14A to terminal 14B and the user 12 can continue activity on terminal 14B.

Figure 5:
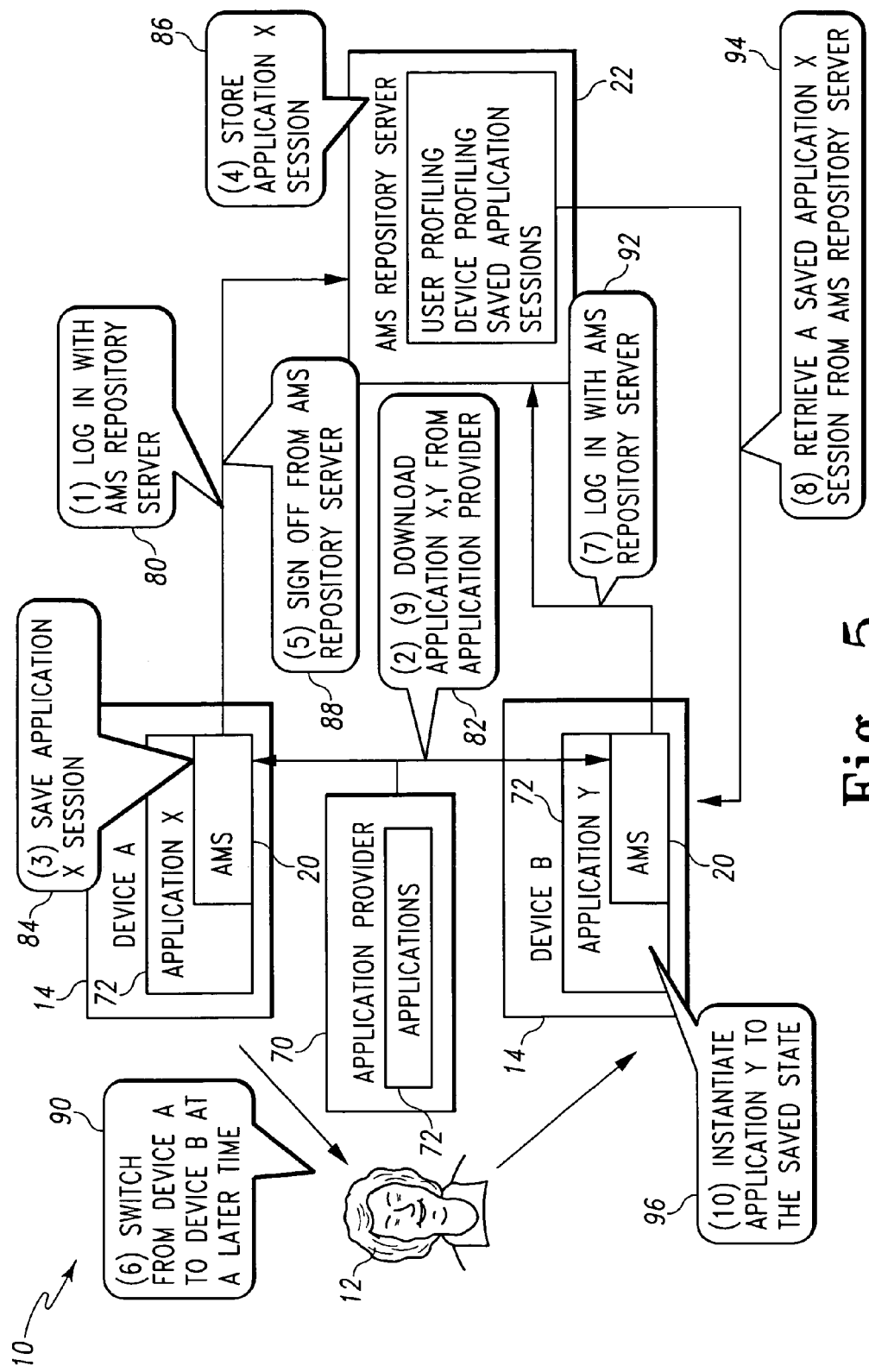
FIG. 5 illustrates an application mobility service for an application provided by an application provider.

In the preferred embodiments set forth above, it was assumed that the user 12 installed platform-specific applications on respective terminals 14A, 14B. Referring to FIG. 5, in yet another preferred embodiment of the present invention the preferred AMS 10 is designed to work with applications that are not installed on the terminals 14A, 14B.

In this case, in order to utilize the AMS 10 an additional service is required, which is provided by an application provider 70.

An application provider 70, as defined herein, should be broadly construed as a service that hosts application code. When a user 12 wants to run an application 72, the user 12 downloads the application code for the application 72 from the application provider 70. The application code could be downloaded on a per use basis or on a subscription basis if the application provider 70 is a commercial service. Optionally, a user 12 can setup their terminal 14A, 14B to host the application code provided from the application provider 70. The application 72 can be either written in platform-independent code or in platform-dependent code.

In this preferred embodiment, the user 12 turns on terminal 14A and the AMS agent 20 on terminal 14A preferentially automatically starts running after power is turned on and the operating system boots-up. At step 80, the AMS agent 20 on terminal 14A then requests the user 12 to log into the AMS repository server 22. As with the other preferred embodiments, the communication between the AMS agent 20 on terminal 14A and the AMS repository server 22 is preferentially through a secure channel or communication network, such as SSL.

During operation, user 12 wants to run application 72X on terminal 14A. However, application 72X is not installed on terminal 14A. As such, at step 82, the AMS agent 20 on terminal 14A downloads remote application 72X from the application provider 70. The application 72 that is downloaded to terminal 14A is preferentially specifically designed for the type of platform that terminal 14A is operating on. Hence, the application is designated as application 72X in FIG. 5 because it is related to the type of platform or operating system that terminal 14A is operating on.

After the application 72X has been downloaded from the application provider 70, terminal 14A starts application 72X and the user 12 can use application 72X to perform whatever type of activities are associated with that particular application. After some period of time the user 12 will want to leave or log off of terminal 14A thereby ending the application session. At step 84, the user 12 requests the AMS agent 20 on terminal 14A to save the application session 16. The user 12 can optionally assign a unique session name to the current application session 16. The AMS agent 20 can also assign a unique session name to the application session 16, such as "application 72X on terminal 14A on DD/MM/YYYY" if the user 12 chooses not to name the application session 16. As with previous embodiments, the user 12 also has an option to protect the application session 16 with a session password.

As set forth above, the AMS agent 20 on terminal 14A informs application 72X to save its session data, such as the document the application 72X has opened and has since modified, preferably into a platform-independent format, if it is available. Then, the AMS agent 20 serializes the session name, the saved session data and optional session password. The serialized data (session name, session data, and optional session password) is then sent to the AMS repository server 22 through a secure channel or communication network.

The AMS repository server 22 receives the serialized data from the AMS agent 20 on terminal 14A and stores the serialized data in a predetermined storage area at step 86. Before the user 12 leaves terminal 14A, the user 12 logs off of the AMS repository server 22, thereby disconnecting terminal 14A from the AMS repository server 22, which is represented at step 88 in FIG. 5. As such, the application session 16 that was created or modified using terminal 14A is now stored on the AMS repository server 22.

At a later period in time, let's say terminal 14B is accessible to the user 12 and that user 12 wants to use terminal 14B to continue the saved application session 16, which is represented at step 90. As such, the user 12 first logs into the AMS repository server 22 from the AMS agent 20 on terminal 14B as illustrated in step 92. The user 12 uses the AMS agent 20 on terminal 14B to request a list of saved application sessions 16 from the AMS repository server 22. The AMS repository server 22 generates the list of saved application sessions and sends it to terminal 14B.

The user 12 is then able to select a respective saved application session 16 that he or she was working on using terminal 14A. If the session is protected by a password, the user 12 will need to enter the correct password to retrieve the session from the AMS repository server 22. The AMS agent 20 on terminal 14B then downloads the serialized session data to terminal 14B through a secure channel, which is illustrated at step 94. Those skilled in the art would recognize that several different kinds of network connections exist that could be used to connect the terminals 14A, 14B to the AMS repository server 22.

Upon receiving the downloaded session data, the AMS agent 20 de-serializes the application session data. The AMS agent 20 searches for application 72Y, that performs the same functionalities on terminal 14B as remote application 72X on terminal 14A, on terminal 14B and finds application 72Y is not installed. The AMS agent 20 then downloads the remote application code from the application provider 70, which is represented at step 82. After application 72Y is downloaded, the AMS agent 20 restores application 72Y on terminal 14B and restores application 72Y to a state according to the saved machine independent session data, such as re-opens the document and displays the page the user 12 was working on when the user 12 logged off of terminal 14A. As such, the user 12 has successfully migrated his or her previous application session from terminal 14A to terminal 14B and can continue activity on terminal 14B.

While the invention has been described in its currently best-known modes of operation and embodiments, other modes, embodiments and advantages of the present invention will be apparent to those skilled in the art and are contemplated herein. Although those skilled in the art would recognize that other embodiments of the present invention are envisioned, it is the claims that follow that that define the broad scope of the present invention.

What is claimed is:

1. A method of preserving application sessions among multiple terminals, comprising:

capturing an active application session of a first application on a first terminal by an application mobility service agent located on said first terminal, the active application session being decoupled from the first application for use by a user of the first terminal at another terminal, wherein the active application session comprises a session name, platform-independent application code, and session data indicative of an application session state, wherein the session data is saved in a platform-independent format, wherein the active application session is independent of the architecture and operating system of the first terminal to allow the active application session to move from the active application session on the first terminal to another session on another terminal that uses the same active application session captured on the first terminal;

storing the active application session on a central storage device, wherein the active application session that is stored on said central storage device is stored in a database associated with the user to allow retrieval of the active application session from another terminal at a later time after the first terminal is disconnected from the central storage device;

retrieving said active application session from the database associated with the user of said central storage device with an application mobility service agent located on a second terminal; and restoring at least one application to the same active application session as the active application session captured on said first terminal by the application mobility service agent located on the second terminal, without having to restart the active application session on the second terminal.

2. The method of claim 1, further comprising logging into an application mobility service agent.

3. The method of claim 1, wherein said application session state is captured by an application mobility service agent located on said first terminal.

4. The method of claim 1, wherein said application session is retrieved by the application mobility service agent on said second terminal using an access network connection between said second terminal and said central storage device.

5. The method of claim 4, wherein said application session state is restored on said second terminal by said application mobility service agent.

6. The method of claim 4, wherein said access network connection is a wireless access network connection or a wired access network connection.

7. The method of claim 1, further comprising assigning a unique session name to said application session.

8. An application mobility system, comprising:

a first terminal including an application mobility service agent;

an application located on said first terminal, wherein said application mobility service agent is operable to capture an active application session of said application on said first terminal, the active application session being decoupled from the application for use by a user of the first terminal at another terminal, wherein the active application session comprises a session name, platform-independent application code, and session data indicative of an application session state, wherein the session data is saved in a platform-independent format, wherein the active application session is independent of the architecture and operating system of the first terminal to allow the active application session to move from the active application session on the first terminal to another session on another terminal that uses the same active application session captured on the first terminal;

a central storage device connected to said first terminal, wherein said application mobility service agent is operable to transmit said active application session to said central storage device, wherein the active application session that is stored on said central storage device is stored in a database associated with the user to allow retrieval of the active application session from another terminal at a later time after the first terminal is disconnected from the central storage device; and a second terminal connected to said central storage device and including said application and an application mobility service agent operable to retrieve said active application session from the database associated with the user of said central storage device, wherein said application mobility service agent on said second terminal restores said application to the same active session as the active application session captured on said first terminal without having to restart the active application session on the second terminal.

9. The application mobility system of claim 8, wherein said application session is captured using an access network connection between said first terminal and said central storage device.

10. The application mobility system of claim 9, wherein said access network connection is a wireless access network connection or a wired access network connection.

11. The application mobility system of claim 8, wherein said first or second terminals may be selected from a group of terminals consisting of a wireless telephone, a personal digital assistant, a desktop personal computer and a networked computing device.

12. The application mobility system of claim 8, wherein a unique session name is assigned to said application session.

13. A method of preserving application sessions among multiple terminals, comprising:
  capturing an active application session from a first application on a first terminal, the active application session being decoupled from the first application for use by a user of the first terminal at another terminal, wherein the active application session comprises a session name, platform-independent application code, and session data indicative of an application session state, and wherein the active application session is independent of the architecture and operating system of the first terminal to allow the active application session to move from the active application session on the first terminal to another session on another terminal that uses the same active application session captured on the first terminal;
  storing said active application session on a central storage device, wherein the active application session that is stored on said central storage device is stored in a database associated with the user to allow retrieval of the active application session from another terminal at a later time after the first terminal is disconnected from the central storage device;
  retrieving said active application session from the database associated with the user of said central storage device using a second terminal; and
  restoring a second application to the same active application session capture on said first terminal without having to restart the active application session on the second terminal.

14. The method of claim 13, further comprising logging into an application mobility agent.

15. The method of claim 13, wherein said application session state is captured by an application mobility service agent located on said first terminal.

16. The method of claim 13, wherein said application session is restored on said second application using an application mobility service agent located on said second terminal.

17. The method of claim 13, wherein said application session is downloaded by an application mobility service agent on said second terminal to said second terminal using an access network connection between said second terminal and said central storage device.

18. The method of claim 17, wherein said access network connection is a wireless access network connection or a wired access network connection.

19. The method of claim 13, further comprising assigning a unique session name to said application session.

20. The method of claim 19, wherein said application session state is captured by an application mobility service agent located on said first terminal.

21. A method of providing application code and preserving application session states among multiple terminals, comprising:
  downloading an application in a first application code format from an application provider with a first terminal;
  running said first application in said first application code format on said first terminal;
  capturing an application session state of said first application on said first terminal wherein the application session comprise a session name, platform-independent application code, and session data indicative of an application session state, wherein the session data is saved is a platform-independent form, wherein the application session state is independent of the architecture and operating system of the first terminal to allow the application session state to move from an application session on the first terminal to another session another terminal that uses the same application session state captured on the first terminal;
  storing said application session state on a central storage device;
  retrieving said application in a second application code format from said application provider with a second terminal, the second application code format being different than the first application code format;
  retrieving said application session state from said central storage device with said second terminal; and
  restoring said application in said second application code format on said second terminal to the same application session state as the application session state captured on the first terminal without having to restart the application session state on the second terminal.

22. The method of claim 21, wherein said application session state is restored on said second terminal with an application mobility service agent located on said second terminal.

23. The method of claim 21, wherein said application session state that is stored on said central storage device is stored in a database associated with a user of said first terminal.

24. The method of claim 21, wherein said application session state is downloaded by an application mobility service agent to said second terminal using an access network connection between said second terminal and said central storage device.

25. The method of claim 24, wherein said access network connection is a wireless access network connection or a wired access network connection.

26. The method of claim 21, further comprising assigning a unique session name to said application session state.

27. An application mobility system, comprising:
  an application in a first application code format located on an application provider server;
  a first terminal connected to said application provider server, wherein said first terminal is operable to download said application from said application provider server;

an application mobility service agent located on said first terminal, wherein said application mobility service agent is operable to capture an application session state from said application on said first terminal wherein the active application session comprise a name, platform-independent application code, and session data indicative of an application session state, wherein the session application code, wherein the data is saved is a platform-independent form, wherein the application session state is independent of the architecture and operating system of the first terminal to allow the application session state to move from an application session on the first terminal to another session on another terminal that uses the same application session state captured on the first terminal;

a repository server connected to said first terminal, wherein said application mobility service agent is operable to store said application session state on said repository server;

a second terminal connected to said application provider server and said repository server, wherein said second terminal includes said application mobility service agent operable to download said application in a second application code format from said application provider server, the second application code format being different than the first application code format, wherein said application mobility service agent on said second terminal starts said application in said second application code format and restores the said application in said second application code format on said second terminal to the same application session state as the application session state captured on the first terminal without having to restart the application session state on the second terminal. application in said second application code format in said application session state.

* * * * *